United States Patent [19]

Irani

[11] 3,836,356

[45] Sept. 17, 1974

[54] METHODS OF TREATING SILICIOUS MATERIALS TO FORM SILICON CARBIDE

[75] Inventor: Meherwan C. Irani, Pittsburgh, Pa.

[73] Assignee: Eugene F. Buell, Pittsburgh, Pa.

[22] Filed: Sept. 5, 1969

[21] Appl. No.: 855,766

Related U.S. Application Data

[63] Continuation-in-part of Ser. No. 764,041, Sept. 26, 1968, abandoned.

[52] U.S. Cl............................ 75/33, 75/39, 423/345
[51] Int. Cl............................................ C21B 13/00
[58] Field of Search .... 75/33, 39; 23/208 R, 208 A, 23/204

[56] References Cited
UNITED STATES PATENTS

| 1,719,970 | 7/1929 | Eldridge............................... 23/208 |
| 1,859,856 | 5/1932 | White............................. 23/208 UX |

FOREIGN PATENTS OR APPLICATIONS

| 727,497 | 4/1955 | Great Britain................... 23/208 A |

*Primary Examiner*—L. Dewayne Rutledge
*Assistant Examiner*—J. M. Davis
*Attorney, Agent, or Firm*—Buell, Blenko & Ziesenheim

[57] ABSTRACT

A method is provided for treating oxygen bearing silicious materials, particularly those containing ferrous metal to produce silicon carbide and metallic iron comprising the steps of mixing a silicious material with at least a stoichiometric amount of carbon to combine with the oxygen bearing silicon compounds in the material to form silicon carbide and to reduce the oxygen compounds of iron to the metallic state, heating the mixture in a non-oxidizing atmosphere to a temperature in excess of 2,500°F., holding the temperature until there is no further reaction between silicon and carbon, comminuting the resulting product to free any metallic iron formed, separating the metallic iron magnetically and collecting the non-magnetic residue as silicon carbide.

5 Claims, No Drawings

METHODS OF TREATING SILICIOUS MATERIALS TO FORM SILICON CARBIDE

This application is a continuation-in-part of my copending application Ser. No. 764,041 filed Sept. 26, 1968, now abandoned.

This invention relates to methods of treating silicious materials particularly those containing ferrous metal and particularly to a method of utilizing iron bearing silicious materials such as tailings from the mining and concentration taconites, non-magnetic semi-taconites, low-grade highly silicious iron ores, tailings resulting from mining and concentration of porphyry copper and molybdenum ores to produce metallic iron and silicon carbide.

The present invention is peculiarly important at the present time because it provides a solution to the pollution problem created by waste materials resulting from mining, processing and/or beneficiating of mineral materials. In addition, this invention makes it commerically feasible and possible to utilize the quantities of iron contained in vast resources of semi-taconites which are low-grade silicious iron ore deposits occurring in the Great Lakes region of the United States and Canada as well as in other parts of the world. These semi-taconites and other low-grade silicious iron ores may be economically utilized by the process of this invention.

I have found that by processing waste iron bearing silicious materials with carbonaceous materials like coal, petroleum refinery residues, coal tar, and such other materials, at a temperature in excess of 2500°F. in a reducing or neutral atmosphere, a product consisting of a mixture of silicon carbide and metallic iron is produced. I have discovered that by comminuting the resulting product by grinding, crushing or the like it is possible to separate metallic iron by magnetic means leaving a non-magnetic residue which is predominantly silicon carbide. This silicon carbide can be collected and used in making abrasives, as metallurgical additives and or other purposes to which silicon carbide is conventionally used.

Starting materials for the process according to my invention may be tailings resulting from taconite mining and beneficiation operations, other iron bearing silicious materials resulting from mining, dredging and processing of mineral materials such as sand and gravel, quartzite, sandstone or any other materials containing iron and silicon. Any or all of these materials or mixtures thereof may be used. These materials furnish the source of silicon needed for the process.

The carbonaceous materials required for the process may be coking or non-coking coal, anthracite, lignite, chars, pitch, coal tar, petroleum refinery residues, crude oil, petroleum coke, charcoal, wood, waste materials of pulp and paper industry or any other carbonaceous materials of any origin. Any of these materials above or in combination may be used as a source of carbon required for the process.

While any or all of these materials could be used, the preferred materials are tailings resulting from beneficiation of taconites and coking coal.

The procedure of the process is as follows:

Conversion of iron containing silicious material to a product containing silicon and metallic iron. This is accomplished by reacting at temperatures in excess of 2,500°F., such iron containing silicious materials with carbon containing materials, preferably coking coal. The resulting silicon carbide and metallic iron may be separated for subsequent use.

The following specific example will illustrate the process:

EXAMPLE

To one part by weight of minus 14 mesh taconite tailings containing 75 percent silica ($SiO_2$) and 20 percent iron oxides was added two parts by weight of Pittsburgh coking coal crushed to minus quarter inch size. The mixture was coked at 3,000°F. in absence of air over a period of six hours till the coked product attained a temperature of 3,000°F. At 3000°F. the silicia and iron oxide react with carbon according to the following reactions:

$$SiO_2 + 3C = SiC + 2CO$$
$$Fe_2O_3 + 3C = 2Fe + 3CO$$

The coked product was maintained at 3000°F. for an additional hour and then removed from the oven and quenched in water. The analysis of the quenched material showed that almost all of the silica originally present in the iron bearing silicious material was converted to silicon carbide. The product was ground and passed over a magnetic separator which removed the metallic iron and the balance of the material was collected as silicon carbide with a small amount of carbon residue.

My research to date has shown that when iron containing silicious material is mixed with a carbon containing material and the mixture heated to temperatures in excess of 2,500°F. in a reducing or neutral atmosphere, the iron oxides in the mixture are reduced to metallic iron and the silica combines with carbon to form silicon carbide. The time necessary for the completion of the formation of silicon carbide is a function of temperature. I have found that by prior coking at a temperature of over 2,500°F. the iron bearing silicious material with enough coking coal to furnish carbon in excess of the stoichiometric amount required for the conversion of silica and iron oxides to silicon carbide and metallic iron, conversion of better than 95 percent of $SiO_2$ to SiC are achieved. I have found that under such conditions essentially all of the silicia in a mixture of one part by weight of minus 14 mesh taconite tailings with two parts by weight of Pittsburgh coking coal is converted to silicon carbide when heated for one hour at 3,000°F. in a reducing atmosphere. The resulting product, as such, is suitable for use in iron and steel smelting and refining, and for addition of iron, silicon and carbon to foundry iron in cupola, ladle, or runners as disclosed in my copending application Ser. No. 764,041 filed Sept. 26, 1968. The coked material may be further upgraded by grinding it and separating the iron magnetically from the ground product, igniting the carbon contained in the non-magnetic fraction and leaching out the non-silicon carbide mineral constituent with strong mineral acids. The treated product so prepared is suitable for manufacture of high silicon steel, silicon carbide ceramics and as a chemical raw material for manufacture of silicon compounds.

Many changes can be made in the details of steps of the process without departing from the spirit of the invention. The inventor, therefore, does not wish to be restricted to the exact details and arrangements described, the preferred forms, and steps only have been shown and described by way of illustration. Any iron bearing silicious material can be used. Any carbonaceous material may be used as a source of carbon, the silica and iron constituents of the inorganic matters which may be present in the carbonaceous material being not detrimental to the process. The furnace in which the material is processed may be fired by coal, gas, oil, electricity or a combination of fuels. The atmosphere within the furnace may be reducing or inert. The ratio of fixed carbon to the silicious material may be in stoichiometric proportion necessary for the formation of silicon carbide from the silicious constituents of the charge to the furnace or a several fold excess of carbons may be used. In practice, the amount of carbon used will be determined by the contemplated use of the processed product and the type of furnace in which the process is conducted; for example, when a rotary hearth furnace is used, sufficient excess coal may be added to liberate enough volatile materials to furnish the heat required to maintain the furnace at the desired reaction temperature in a reducing atmosphere. The carbon containing material may be powdered coal, anthracite, coke breeze, sawdust, chars, coal tar, residues from petroleum refining, pitch or any other carbonaceous material or mineral or vegetable origin or mixtures of these materials. In short, carbon, as referred to herein, may be one of the forms of relatively pure carbon, coal, coke, ferro-coke, or a constituent of a complex carbonaceous material. The mixture of iron containing silicious material and carbonaceous material may be heated as such or the silicious materials may be initially carbonized or coked with a carbonaceous material or a mixture of carbonaceous materials in desired proportions and then heated to desired reaction temperature in a suitable furnace. Alternatively, the mixture of silicious and carbonaceous materials may be ground together or mixed together after being ground separately, and the mixture converted into pellets with or without the addition of binding materials like sodium silicate or bentonite clay and the pellets fired to the desired reaction temperature in a furnace in which a reducing atmosphere is maintained.

The process of this invention may be conducted in a rotary kiln, by product coke ovens, beehive coke ovens, grate type furnace, tunnel kiln, rotary hearth furnace, electric resistance of induction type furnace or any other furnace in which a temperature in excess of 2,500°F. in a reducing or inert atmosphere may be obtained. While any of these furnaces may be used, the most preferred furnaces are the by product type coke ovens, beehive coke ovens and the rotary hearth type furnace in which the combustion of volatile matter liberated from the coal is burned within the furnace under reducing condition.

Successful use of this invention will abate the disposal problem connected with waste tailings resulting from taconite mining and processing operations by converting it into a useful product. It will conserve the Nation's reserves of iron by economically recovering the iron being currently discarded in the tailings resulting from iron ore beneficiating operations. The process of this invention will make it possible to utilize large quantities of iron contained in the non-magnetic taconites or semi-taconite deposits. It will also permit utilization of very large quantities of iron bearing silicious tailings resulting from the mining and processing of copper and molybdenum from the large porphyry deposits of these metals in the Western United States and other parts of the world. Such tailings currently present serious disposal and pollution problems and are being stored in large piles. The process of this invention by converting these waste materials into useful products will solve the disposal and pollution problems associated with these materials and will also make available the land presently being used for storage of these waste materials for other more useful purposes and eliminate the eyesore resulting from these huge piles of waste materials. Very large quantities of taconite tailings are at present being dumped into the Great Lakes adjacent to the large mining and processing plants. Dumping of these tailings into the lakes present serious hazard to the aquatic life of the lakes and jeopardize the quality of these waters. The process of my invention, by economically converting these tailings into useful products will eliminate this serious disposal and pollution problem. Currently, the tailings from the taconite beneficiation plants contain as much as 13 percent iron. Successful utilization of the process of my invention will prevent irrevocable waste of the Nation's irreplaceable iron resources by recovering the iron content of these tailings as well as furnishing a substantial amount of silicon carbide.

While I have disclosed certain preferred practices of my invention in the foregoing specification, it will be understood that this invention may be otherwise embodied within the scope of the following claims.

I claim:

1. A process for treating oxygen bearing silicious iron containing materials comprising the steps of mixing an oxygen bearing silicious iron containing material with an excess of coking coal over that amount sufficient to combine with the oxygen bearing silicon compounds in the material to form silicon carbide and reduce all oxygen compounds of iron to the metallic state, heating the mixture to a temperature in excess of 2,500°F. in a non-oxidizing atmosphere generated by the partial combustion outside the mixture of the volatile matter released within the furnace by the coking of the coal, holding the temperature until there is no further reaction between silica and carbon, cooling the resultant product, comminuting the cooled product, magnetically separating any metallic iron from the crushed product and recovering the non-magnetic portion as predominately silicon carbide.

2. A process as claimed in claim 1 wherein the non-magnetic portion remaining after magnetic separation is leached with mineral acid and the residue recovered as silicon carbide.

3. A process as claimed in claim 1 wherein the coking furnace is a rotary hearth furnace.

4. A process as claimed in claim 1 wherein the coking furnace is a by-product coking furnace.

5. A process as claimed in claim 1 wherein the coking furnace is a beehive coking furnace.

* * * * *